US012624242B2

(12) United States Patent
Nakatani et al.

(10) Patent No.: US 12,624,242 B2
(45) Date of Patent: May 12, 2026

(54) WATER-BASED COLORING COMPOSITION, COLORING METHOD, PIGMENT DISPERSION LIQUID, AND METAL PIGMENT PRODUCING METHOD

(71) Applicant: SEIKO EPSON CORPORATION, Tokyo (JP)

(72) Inventors: Mitsunobu Nakatani, Shiojiri (JP); Kei Hiruma, Chino (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 401 days.

(21) Appl. No.: 18/340,084

(22) Filed: Jun. 23, 2023

(65) Prior Publication Data

US 2023/0416553 A1     Dec. 28, 2023

(30) Foreign Application Priority Data

Jun. 24, 2022     (JP) ................................. 2022-101665

(51) Int. Cl.
| | |
|---|---|
| *C09D 17/00* | (2006.01) |
| *C08K 3/08* | (2006.01) |
| *C08K 9/04* | (2006.01) |

(52) U.S. Cl.
CPC ......... *C09D 17/006* (2013.01); *C09D 17/003* (2013.01); *C08K 2003/0812* (2013.01); *C08K 9/04* (2013.01)

(58) Field of Classification Search
CPC ...... C09D 17/006; C09D 17/003; C08K 9/04; C08K 2003/0812
See application file for complete search history.

(56) References Cited

FOREIGN PATENT DOCUMENTS

| | | | |
|---|---|---|---|
| JP | 2013-227453 A | | 11/2013 |
| JP | 2015-140359 A | | 8/2015 |
| JP | 2019-077745 A | | 5/2019 |
| JP | 2019077746 A | * | 5/2019 |

OTHER PUBLICATIONS

English machine translation of JP-2019077746-A (Year: 2019).*

* cited by examiner

*Primary Examiner* — Anthony J Green
*Assistant Examiner* — Jeffrey Eugene Barzach
(74) *Attorney, Agent, or Firm* — Harness, Dickey & Pierce, P.L.C.

(57) ABSTRACT

A water-based coloring composition contains a metal pigment, water, and an organic solvent. The metal pigment is surface-treated with a first surface treatment agent and a second surface treatment agent, the first surface treatment agent contains a phosphonic-acid-based compound denoted by Formula (1) or a phosphoric-acid-based compound denoted by Formula (2), the second surface treatment agent contains a phosphonic-acid-based compound denoted by Formula (3) or a phosphoric-acid-based compound denoted by Formula (4), and the carbon number of $R^1$ or $R^2$ of the first surface treatment agent is higher than the carbon number of $R^3$ or $R^4$ of the second surface treatment agent.

13 Claims, 1 Drawing Sheet

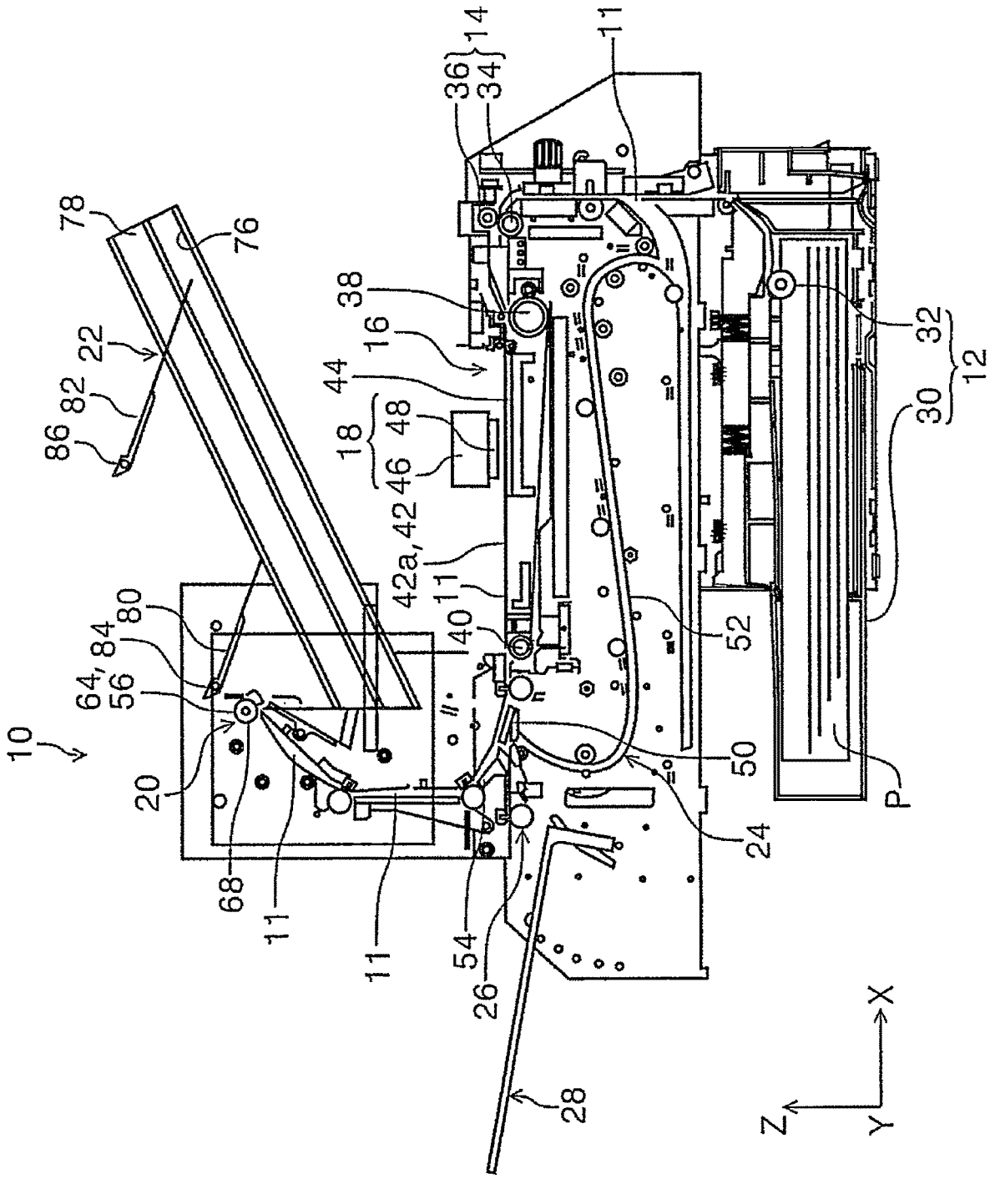

WATER-BASED COLORING COMPOSITION, COLORING METHOD, PIGMENT DISPERSION LIQUID, AND METAL PIGMENT PRODUCING METHOD

The present application is based on, and claims priority from JP Application Serial Number 2022-101665, filed Jun. 24, 2022, the disclosure of which is hereby incorporated by reference herein in its entirety.

BACKGROUND

1. Technical Field

The present disclosure relates to a water-based coloring composition, a coloring method, a pigment dispersion liquid, and a metal pigment producing method.

2. Related Art

To date, compositions such as inks and paints containing a metal pigment, for example, aluminum, have been developed to produce articles having glossy metallic appearance. In this regard, in recent years, from the viewpoint of global environment, ease of handling, and the like, aqueous compositions containing water as a main solvent rather than nonaqueous compositions containing an organic solvent as a main solvent have been targeted in development of the compositions.

For example, JP-A-2015-140359 discloses a base metal pigment serving as a base metal pigment for an aqueous ink composition, wherein the base metal pigment is surface-treated with a fluorine-based compound, and the base metal pigment has a predetermined zeta potential, to provide a base metal pigment having favorable water resistance and dispersion stability in a water-based medium.

As described in JP-A-2015-140359, an improvement in water resistance and dispersibility due to surface treatment with a fluorine-based compound is expected. However, a metal pigment used in a water-based ink is desired to have still more water resistance and dispersibility or improved dispersion stability. In addition, as a matter of course, an improvement in glossiness is also required.

SUMMARY

A water-based coloring composition according to an aspect of the present disclosure contains a metal pigment, water, and an organic solvent, wherein the metal pigment is surface-treated with a first surface treatment agent and a second surface treatment agent, the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, and the carbon number of $R^1$ or $R^2$ of the first surface treatment agent is higher than the carbon number of $R^3$ or $R^4$ of the second surface treatment agent.

$$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \tag{3}$$

(in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2)

A coloring method according to an aspect of the present disclosure includes attaching a coloring composition containing the above-described water-based coloring composition to an object to be colored.

A pigment dispersion liquid according to an aspect of the present disclosure contains a metal pigment, water, and an organic solvent, wherein the metal pigment is surface-treated with a first surface treatment agent and a second surface treatment agent, the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, and the carbon number of $R^1$ or $R^2$ of the first surface treatment agent is higher than the carbon number of $R^3$ or $R^4$ of the second surface treatment agent.

$$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \tag{3}$$

(in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2)

A metal pigment producing method according to an aspect of the present disclosure includes a first surface treatment step of surface-treating a metal pigment with a first surface treatment agent and a second surface treatment step of surface-treating the metal pigment surface-treated with the first surface treatment agent with a second surface treatment agent, wherein the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, and the carbon number of $R^4$ or $R^2$ of the first surface treatment agent is higher than the carbon number of $R^3$ or $R^4$ of the second surface treatment agent.

$$(R^1)PO(OH)_2 \qquad (1)$$

(in Formula (1), $R^1$ represents a hydrocarbon group having a carbon number of 12 or more in which a hydrogen atom is not limited to being substituted with a substituent)

$$(R^2O)_aPO(OH)_{3-a} \qquad (2)$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \qquad (3)$$

(in Formula (3), $R^3$ represents a hydrocarbon group having a carbon number of 4 or more in which a hydrogen atom is not limited to being substituted with a substituent)

$$(R^4O)_bPO(OH)_{3-b} \qquad (4)$$

(in Formula (4), $R^4$ represents independently a hydrocarbon group having a carbon number of 4 or more in which a hydrogen atom is not limited to being substituted with a substituent, and b is an integer of 1 or 2)

BRIEF DESCRIPTION OF THE DRAWING

FIGURE is a diagram illustrating an example of a coloring apparatus used in a coloring method according to the present embodiment.

DESCRIPTION OF EXEMPLARY EMBODIMENTS

The embodiment according to the present disclosure (hereafter referred to as "the present embodiment") will be described below in detail with reference to the drawing, as the situation demands. However, the present disclosure is not limited to this and can be variously modified within the bounds of not departing from the scope of the disclosure. In this regard, in the drawing, the same elements are indicated by the same references and duplicate explanations may be omitted. The positional relationship in the vertical direction, the horizontal direction, or the like is in accord with the positional relationship illustrated in the drawing, unless otherwise specified. Further, the actual dimensional ratios are not limited to the ratios illustrated in the drawing.

1. Water-Based Coloring Composition

A water-based coloring composition according to the present embodiment (hereafter also referred to simply as "coloring composition") contains a metal pigment, water, and an organic solvent, wherein the metal pigment is surface-treated with a first surface treatment agent and a second surface treatment agent, the first surface treatment agent contains a phosphoric-acid-based compound denoted by Formula (1) below or a phosphoric-acid-based compound denoted by Formula (2) below, the second surface treatment agent contains a phosphoric-acid-based compound denoted by Formula (3) below or a phosphoric-acid-based compound denoted by Formula (4) below, and the carbon number of $R^1$ or $R^2$ of the first surface treatment agent is higher than the carbon number of $R^3$ or $R^4$ of the second surface treatment agent.

$$(R^1)PO(OH)_2 \qquad (1)$$

(in Formula (1), $R^1$ represents a hydrocarbon group having a carbon number of 12 or more in which a hydrogen atom is not limited to being substituted with a substituent)

$$(R^2O)_aPO(OH)_{3-a} \qquad (2)$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \qquad (3)$$

(in Formula (3), $R^3$ represents a hydrocarbon group having a carbon number of 4 or more in which a hydrogen atom is not limited to being substituted with a substituent)

$$(R^4O)_bPO(OH)_{3-b} \qquad (4)$$

(in Formula (4), $R^4$ represents independently a hydrocarbon group having a carbon number of 4 or more in which a hydrogen atom is not limited to being substituted with a substituent, and b is an integer of 1 or 2)

To date, regarding coloring compositions containing a metal pigment, for the purpose of improving the water resistance and the like, coloring compositions containing a metal pigment surface-treated with a surface treatment agent such as a fluorine-based surface treatment agent have been researched. However, there is room for further research to improve the water resistance.

In this regard, for the purpose of further improving the glossiness, scale-like (planar) and thin metal pigments have been developed. When individual particles of the metal pigment have a larger surface area and a smaller thickness, as described above, since the surface area per mass of the metal pigment increases, the surface direction of the scale-like metal pigment tends to be further oriented parallel to the surface direction of the object to be colored, and the scale-like metal pigment forms a glossy layer, the resulting colored material has excellent glossiness. Such orientation is also referred to as "leafing".

Regarding such a scale-like metal pigment, the glossiness of the resulting colored material is improved. On the other hand, aggregation tends to occur, and the dispersibility tends to be deteriorated. Further, expected glossiness is not limited to being obtained due to aggregation.

Therefore, research has been performed on suppression of aggregation and an improvement in dispersibility due to surface treatment with a surface treatment agent. In general, it is considered that a metal pigment having excellent water resistance is obtained by performing surface treatment with a surface treatment agent having a long-chain alkyl group or the like (hereafter also referred to as "long-chain surface treatment agent") rather than with a surface treatment agent having a short-chain alkyl group or the like (hereafter also referred to as "short-chain surface treatment agent"). However, even when surface treatment with a long-chain surface treatment agent is performed, it cannot be said that the water resistance is sufficient.

Regarding this point, the present inventors performed intensive research to further improve the water resistance. As a result, it was found that when surface treatment with a long-chain surface treatment agent is performed, the long-chain alkyl group can suppress a water molecule from approaching the metal pigment surface, but surface treatment with the long-chain surface treatment agent tends to be coarse since the long-chain surface treatment agent does not readily enter a gap between a plurality of long-chain surface treatment agents coupled to the metal pigment.

Therefore, in the present embodiment, the metal pigment is surface treated with the first surface treatment agent corresponding to the long-chain surface treatment agent and the second surface treatment agent corresponding to the short-chain surface treatment agent. Consequently, a gap between the long-chain surface treatment agents can be further surface treated with the short-chain surface treatment agent. Accordingly, the water resistance and the dispersibility can be further improved. As a result, the glossiness can also be improved.

In this regard, in the present embodiment, the water-based composition denotes a composition in which the content of water in the composition is 20% by mass or more relative to the total solvent component. The water resistance in the present embodiment is a function of suppressing gas from being generated when the metal pigment is brought into contact with water due to, for example, being mixed into an aqueous paint or an aqueous ink. In addition, the coloring composition is a composition, for example, an ink jet ink or a paint composition, which itself can be used for a coloring method.

The water-based coloring composition, the coloring method, the pigment dispersion liquid, and the metal pigment producing method, and the like according to the present embodiment will be described below in detail.

1.1. Metal Pigment

The metal pigment according to the present embodiment is surface-treated with a surface treatment agent. There is no particular limitation regarding the relationship between the metal pigment and the surface treatment agent according to the present embodiment. For example, the metal pigment may be chemically bonded to the surface treatment agent by being surface-modified with the surface treatment agent due to a reaction between a —OH group or the like of the metal pigment surface and a functional group of the surface treatment agent.

There is no particular limitation regarding the metal pigment. For example, the entire metal pigment may be composed of a metal material, or the metal pigment may include a base portion composed of a nonmetal material and a coating film composed of a metal material for coating the base portion surface. In this regard, the base portion composed of a nonmetal material is, for example, a scale-like resin, and the entire surface thereof may be coated with a metal material.

The content of the metal pigment can be appropriately adjusted in accordance with the application, that is, whether the coloring composition is a pigment dispersion liquid, a paint composition, an ink composition, or the like. Regarding an example of various applications, the content of the metal pigment is preferably 0.1% by mass or more and 30% by mass or less, more preferably 0.3% by mass or more and 25% by mass or less, further preferably 0.5% by mass or more and 20% by mass or less, and still further preferably 1.0% by mass or more and 10% by mass or less relative to the total amount of the coloring composition. When the content of the metal pigment is within the above-described range, the dispersibility, the glossiness, and the water resistance tend to be excellent.

1.1.1. Constituent Material

There is no particular limitation regarding the metal species constituting the metal pigment. For example, simple metals and various alloys can be used. There is no particular limitation regarding such a metal species, and examples include aluminum, silver, gold, platinum, nickel, chromium, zinc, indium, titanium, iron, and copper. Of these, a metal pigment containing a base metal is favorable, a metal pigment containing aluminum or an aluminum alloy is more favorable, and a metal pigment composed of aluminum or an aluminum alloy is further favorable. Consequently, in particular, such a metal species, among various metal materials, tends to provide excellent glossy appearance. In addition, aluminum or an aluminum alloy has a relatively lower specific gravity than other types of metal materials and, therefore, tends to have excellent dispersibility. Further, aluminum or an aluminum alloy is superior in point of suppressing the production cost of a colored material produced by using the coloring composition containing the metal pigment from increasing. In this regard, only one type of the metal pigments may be used, or two or more types thereof may be used in combination.

1.1.2. Shape of Particle

There is no particular limitation regarding the shape of the metal pigment. The metal pigment may have any shape, for example, a scale-like (planar) shape, a spherical shape, a spindle shape, and a needle-like shape. Of these, a scale-like shape is favorable, and it is more favorable that the metal pigment have a scale-like shape and have a small thickness. When the metal pigment has a scale-like shape, the glossiness of the resulting colored material tends to be further improved since, on the object to be colored, the wide surface of a particle is arranged along the surface of the object to be colored.

In this regard, in the present embodiment, the scale-like shape is a shape, such as a planar shape or a curved-plate-like shape, having an area in plan view when observed at a predetermined angle is larger than the area observed at an angle at which the direction is orthogonal to the observation direction.

There is no particular limitation regarding the method for measuring the physical properties of the metal pigment particle based on the observation. For example, the observation may be performed based on the AFM method (atomic force microscope method). The AFC method can be used when, for example, the average thickness is measured. There is no particular limitation regarding the atomic force microscope. For example, NanoNavi E-Sweep (produced by SII Nano Technology Inc.) can be used.

1.1.3. Volume Average Particle Diameter

When the volume average particle diameter $D_{50}$ of the metal pigment in the coloring composition increases, the glossiness tends to be excellent, and when it decreases, the dispersibility tends to be excellent. The favorable range thereof may be determined in accordance with the application of the coloring composition. The volume average particle diameter $D_{50}$ of the metal pigment in the coloring composition is preferably 0.10 μm or more and 15 μm or less, more preferably 0.20 μm or more and 12 μm or less, and further preferably 0.30 μm or more and 9.0 μm or less. When the volume average particle diameter $D_{50}$ of the metal pigment is within the above-described range, the glossiness, the dispersibility, and/or the water resistance tends to be excellent.

In addition, from the same viewpoint, when the coloring composition is used as an ink jet ink composition or a component thereof, the volume average particle diameter $D_{50}$ of the metal pigment may be preferably 1.0 μm or less, more preferably 100 nm or more and 1.0 μm or less, more preferably 200 nm or more and 800 nm or less, and further preferably 300 nm or more and 600 nm or less.

Further, from the viewpoint of suitability for use as a paint or a component thereof, the volume average particle diameter $D_{50}$ of the metal pigment may be preferably 3.0 μm or more and 15 µm or less, more preferably 5.0 µm or more and 12 µm or less, and further preferably 7.0 µm or more and 9.0 µm or less.

The volume average particle diameter $D_{50}$ in the present embodiment is a median diameter with respect to the volume distribution based on the measurement of a particle dispersion liquid by using the laser diffraction scattering method and is a size of a particle when the abundance ratios of the respective sizes of measurement results of a plurality of particles are accumulated and reach just 50% which is the central value of accumulation. When the metal particle has a scale-like shape, the volume average particle diameter is determined in accordance with the shape and the size of a sphere converted from the metal particle.

1.1.4. Preparation of Metal Pigment

There is no particular limitation regarding the method for preparing the metal pigment, and a known method can be used. For example, a scale-like metal pigment can be obtained by forming a metal film on one surface of a sheet-like base material by using a vapor deposition method, peeling the metal film off the sheet-like base material, and performing pulverization. According to the vapor deposition method, a scale-like metal pigment in which variations in the film thickness are reduced and in which the surface has high planarity can be obtained, and the metal glossiness and the like peculiar to the metal pigment can be more effectively realized. In this regard, the thickness of the thin film is the thickness of the scale-like metal pigment. In addition, as the situation demands, the thus obtained metal pigment may be classified to optionally adjust the particle size distribution thereof. Further, an ion plating method or a sputtering method may be used instead of the vapor deposition method.

When a metal pigment composed of aluminum or an aluminum alloy is prepared, from the viewpoint of more effectively expressing the glossy appearance and the like, it is preferable that preparation be performed by pulverizing a film formed by a vapor-phase growth method. In this regard, such a method can also be used for preparing a relatively thin metal pigment.

Regarding the sheet-like base material used in the vapor deposition method, for example, a plastic film such as a polyethylene terephthalate (PET) can be used. In this regard, to enhance the releasability, a film-forming surface of the sheet-like base material may be coated in advance with a mold release agent such as silicone oil or may be provided with a peelable resin layer. Examples of the resin used for the peelable resin layer include polyvinyl alcohols, polyvinyl butyrals, polyethylene glycols, polyacrylic acids, polymethacrylic acids, polyacrylic acid esters, polymethacrylic acid esters, polyacrylamides, cellulose derivatives such as a cellulose acetate butyrate, and modified nylon resins.

Peeling and pulverization of the metal film are performed by, for example, applying ultrasonic waves to the film in an organic solvent and applying external force by agitating with a homogenizer or the like. There is no particular limitation regarding the organic solvent used therefor, and examples of the suitably usable organic solvent include alcohols, such as methanol, ethanol, propanol, and butanol; hydrocarbon-based compounds, such as n-heptane, n-octane, decane, dodecane, tetradecane, toluene, xylene, decahydronaphthalene, and cyclohexylbenzene; ether-based compounds, such as ethylene glycol dimethyl ether, ethylene glycol diethyl ether, ethylene glycol methylethyl ether, diethylene glycol dimethyl ether, bis(2-methoxyethyl) ether, and p-dioxane; and polar organic solvents, such as propylene carbonate, γ-butyrolactone, N-methyl-2-pyrrolidone, N,N-dimethylformamide, and acetonitrile. Using such an organic solvent enables the metal pigment to be suppressed from, for example, being reluctantly oxidized and enables variations in the size, the shape, and the characteristics between particles to be reduced.

1.2. Surface Treatment Agent

In the present embodiment, the metal pigment surface-treated with a first surface treatment agent and a second surface treatment agent is used. The first surface treatment agent according to the present embodiment contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, and the carbon number of $R^1$ or $R^2$ of the first surface treatment agent is higher than the carbon number of $R^3$ or $R^4$ of the second surface treatment agent.

$$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2) (in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2)

The compound denoted by Formula (1) or Formula (3) above (substituted or unsubstituted alkyl phosphonic acid) is a compound in which a hydrogen atom in phosphonic acid is substituted with an $(R_1—)$ group or an $(R_3—)$ group. Such a compound is readily arranged at a position not surface-treated with a long-chain surface treatment agent on the metal particle surface since steric hindrance due to an alkyl section is decreased, and the dispersion stability and the gloss of the metal pigment can be made favorable.

The compound denoted by Formula (2) or Formula (4) above is a compound in which one or two of three hydroxy groups in phosphoric acid are esterified with substituted or unsubstituted alkyl groups.

The compound denoted by Formula (2) or Formula (4) above is a diester body (di-body) of a substituted or unsubstituted alkyl when a or b, respectively, is 1 and is a monoester body (mono-body) of a substituted or unsubstituted alkyl when a or b, respectively, is 2. When a or b, respectively, is 1 (di-body), the compound denoted by Formula (2) or Formula (4) tends to enable the metal pigment to have more excellent water resistance since an effect of preventing a water molecule from approaching the metal particle surface is enhanced due to steric hindrance resulting from two substituted or unsubstituted alkyl sections being present. In this regard, hereafter "monoester body" may also be referred to as "mono-body", and "diester body" may also be referred to as "di-body".

In Formula (1) and Formula (2) above, each of $R^1$ and $R^2$ represents a hydrocarbon group having a carbon number of 12 or more in which a hydrogen atom is not limited to being substituted with a substituent, and in Formula (3) and Formula (4) above, each of $R^3$ and $R^4$ represents a hydrocarbon group having a carbon number of 4 or more in which a hydrogen atom is not limited to being substituted with a substituent. The hydrocarbon group may be any one of a branched chain type, a straight chain type, and a cyclic type and may have a saturated bond or an unsaturated bond. The hydrocarbon group having a carbon number of 12 or more is a hydrocarbon group having a skeleton in which at least 12 carbon atoms are successively bonded. In this regard, the carbon number of each of $R^1$, $R^2$, $R^3$, and $R^4$ does not include the carbon number of the substituent.

There is no particular limitation regarding the type of the substituent of $R^1$, $R^2$, $R^3$, or $R^4$, and examples include a halogen atom, a carboxy group, a hydroxy group, an amino group, and an oxyalkylene group. More specifically, $R^1$, $R^2$, $R^3$, or $R^4$ may be a perfluoro group in which a hydrogen atom in a hydrocarbon group described later is substituted with a fluorine atom. In each of $R^1$, $R^2$, $R^3$, and $R^4$, a portion of hydrogen atoms included in the hydrocarbon group may be substituted with such a substituent. However, the number of substituents included in each of $R^1$, $R^2$, $R^3$, and $R^4$ may be 1 or less, and no substituent may be included. When a substituent is included, regarding the bonding position of the substituent in $R^1$, $R^2$, $R^3$, or $R^4$, it is preferable that the substituent be bonded to a carbon atom located at the position farthest from P or O since the metal pigment tends to have excellent dispersion stability.

An oxyalkylene group have at least one alkylene oxide unit and may have at least two alkylene oxide units. In particular, the oxyalkylene group may have a structure in which a plurality of alkylene oxide units are repeatedly included. The number of repetition of the alkylene oxide units is preferably 10 or less and more preferably 4 or less. The lower limit is 1 or more, preferably 2 or more, and more preferably 3 or more. The carbon number of the alkylene in the alkylene oxide unit is preferably 1 or more and 4 or less.

In this regard, $R^1$, $R^2$, $R^3$, or $R^4$ may be a saturated hydrocarbon group having no double bond nor triple bond between carbon atoms or an unsaturated hydrocarbon group having a double bond or a triple bond between carbon atoms. In this regard, the hydrocarbon group may be an aromatic hydrocarbon group in which the carbon skeleton has an aromatic ring structure or a chain or cyclic aliphatic hydrocarbon group or the like. Of these, $R^1$, $R^2$, $R^3$, or $R^4$ may be a chain aliphatic hydrocarbon group. In addition, the chain aliphatic hydrocarbon group is a branched chain type and a straight chain type and may be a straight chain type.

1.2.1. First Surface Treatment Agent

The first surface treatment agent contains a phosphonic-acid-based compound denoted by Formula (1) above or a phosphoric-acid-based compound denoted by Formula (2) above. From the viewpoint of improving the water resistance of the metal pigment, the first surface treatment agent may contain a phosphonic-acid-based compound denoted by Formula (1) above.

Regarding Formula (1), any one of carbon atoms of $R^1$ that is a hydrocarbon group is directly bonded to a phosphorus atom of Formula (1), and an oxygen atom is directly bonded to the phosphorus atom P. In $R^1$, an atom directly bonded to the phosphorus atom may be a carbon atom at the molecular chain end of $R^1$. Likewise, regarding Formula (2), any one of carbon atoms of $R^2$ that is a hydrocarbon group is directly bonded to an oxygen atom in ($R^2O$) of Formula (2), and the oxygen atom is directly bonded to a phosphorus atom P. In $R^2$, an atom directly bonded to the oxygen atom may be a carbon atom at the molecular chain end of $R^2$.

In Formula (1) or Formula (2), the carbon number of each of $R^1$ and $R^2$ is 12 or more, preferably 12 or more and 32 or less, more preferably 15 or more and 30 or less, further preferably 16 or more and 22 or less, and still further preferably 16 or more and 20 or less. Consequently, the coloring composition has more favorable dispersion stability and water resistance.

In Formula (1) or Formula (2), there is no particular limitation regarding specific examples of $R^1$ or $R^2$. Specific examples include a n-dodecyl group, a n-tridecyl group, a n-tetradecyl group, a n-pentadecyl group, a n-hexadecyl group, a n-heptadecyl group, a n-octadecyl group, a n-nonadecyl group, a n-icosyl group, a n-docosyl group, and a n-tetracosyl group. From the viewpoint of excellent water resistance, dispersibility, and glossiness, $R^1$ or $R^2$ may be a n-dodecyl group, a n-octadecyl group, or a n-docosyl group.

There is no particular limitation regarding specific examples of the phosphonic-acid-based compound denoted by Formula (1), and specific examples include dodecylphosphonic acid, tridecylphosphonic acid, tetradecylphosphonic acid, pentadecylphosphonic acid, hexadecylphosphonic acid, heptadecylphosphonic acid, octadecylphosphonic acid, nonadecylphosphonic acid, icosylphosphonic acid, heneicosylphosphonic acid, and docosylphosphonic acid. From the viewpoint of excellent water resistance, dispersibility, and glossiness, it is preferable to use docosylphosphonic acid, octadecylphosphonic acid, and/or dodecylphosphonic acid as the phosphonic-acid-based compound denoted by Formula (1), it is more preferable to use octadecylphosphonic acid or dodecylphosphonic acid, and it is further preferable to use octadecylphosphonic acid.

There is no particular limitation regarding the phosphoric-acid-based compound denoted by Formula (2), and dodecylphosphoric acid, tridecylphosphoric acid, tetradecylphosphoric acid, pentadecylphosphoric acid, hexadecylphosphoric acid, heptadecylphosphoric acid, octadecylphosphoric acid, nonadecylphosphoric acid, icosylphosphoric acid, didecylphosphoric acid, diundecylphosphoric acid, didodecylphosphoric acid, ditridecylphosphoric acid, ditetradecylphosphoric acid, dipentadecylphosphoric acid, dihexadecylphosphoric acid, diheptadecylphosphoric acid, dioctadecylphosphoric acid, dinonadecylphosphoric acid, and diicosylphosphoric acid. From the viewpoint of excellent water resistance, dispersibility, and glossiness, it is preferable to use octadecylphosphoric acid as the phosphoric-acid-based compound denoted by Formula (2).

The content of the first surface treatment agent is preferably 10% by mass or more and 50% by mass or less, more preferably 12% by mass or more and 48% by mass or less, further preferably 15% by mass or more and 45% by mass or less, and still further preferably 20% by mass or more and 40% by mass or less relative to the total amount of the metal pigment contained in the coloring composition. When the content of the first surface treatment agent is 10% by mass or more, the water resistance tends to be excellent, and when the content is 50% by mass or less, the dispersibility and the glossiness tend to be excellent.

In addition, the content of the first surface treatment agent is preferably 0.05% by mass or more and by mass or less, more preferably 0.10% by mass or more and 2.5% by mass or less, further preferably 0.15% by mass or more and 2.0% by mass or less, and still further preferably 0.20% by mass or more and 1.0% by mass or less relative to the total amount of the coloring composition. When the content of the first surface treatment agent is 0.05% by mass or more relative to the total amount of the coloring composition, the water resistance tends to be excellent, and when the content is 3.0% by mass or less, the dispersibility and the glossiness tend to be excellent.

1.2.2. Second Surface Treatment Agent

The second surface treatment agent contains a phosphoric-acid-based compound denoted by Formula (3) above or a phosphoric-acid-based compound denoted by Formula (4) above.

The difference between the carbon number of $R^1$ or $R^2$ in the first surface treatment agent and the carbon number of $R^3$ or $R^4$ in the second surface treatment agent may be 4 or more and 14 or less. When the difference between the carbon number of $R^1$ or $R^2$ and the carbon number of $R^3$ or $R^4$ is within the above-described range, the water resistance, the glossiness, and the dispersibility tend to be further improved. From the same viewpoint, the difference between the carbon number of $R^1$ or $R^2$ and the carbon number of $R^3$ or $R^4$ is more preferably 5 or more and 12 or less and further preferably 6 or more and 10 or less.

Regarding Formula (3), any one of carbon atoms of $R^3$ that is a hydrocarbon group is directly bonded to a phosphorus atom of Formula (3), and an oxygen atom is directly bonded to the phosphorus atom P. In $R^3$, an atom directly bonded to the phosphorus atom may be a carbon atom at the molecular chain end of $R^3$. Likewise, regarding Formula (4), any one of carbon atoms of $R^4$ that is a hydrocarbon group is directly bonded to an oxygen atom in ($R^4$O) of Formula (4), and the oxygen atom is directly bonded to a phosphorus atom P. In $R^4$, an atom directly bonded to the oxygen atom may be a carbon atom at the molecular chain end of $R^4$.

In Formula (3) or Formula (4), the carbon number of each of $R^3$ and $R^4$ is 4 or more and may be 4 or more and 30 or less. From the viewpoint of excellent water resistance, dispersibility, and glossiness, the carbon number of $R^3$ or $R^4$ is preferably 4 or more and 18 or less, more preferably 4 or more and 12 or less, further preferably 4 or more and 11 or less, and still further preferably 4 or more and 8 or less.

In Formula (3) or Formula (4), there is no particular limitation regarding specific examples of $R^3$ or $R^4$. Specific examples include a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-icosyl group, and a n-tetracosyl group. From the viewpoint of excellent water resistance, dispersibility, and glossiness, $R^3$ or $R^4$ is preferably a n-butyl group, a n-octyl group, a n-dodecyl group, or a n-octadecyl group and more preferably a n-butyl group, a n-octyl group, or a n-dodecyl group.

There is no particular limitation regarding specific examples of the phosphonic-acid-based compound denoted by Formula (3). Specific examples include butylphosphonic acid, pentylphosphonic acid, hexylphosphonic acid, octylphosphonic acid, nonylphosphonic acid, decylphosphonic acid, undecylphosphonic acid, dodecylphosphonic acid, tridecylphosphonic acid, tetradecylphosphonic acid, pentadecylphosphonic acid, hexadecylphosphonic acid, heptadecylphosphonic acid, octadecylphosphonic acid, nonadecylphosphonic acid, icosylphosphonic acid, heneicosylphosphonic acid, and docosylphosphonic acid. From the viewpoint of excellent water resistance, dispersibility, and glossiness, it is preferable to use butylphosphonic acid, octylphosphonic acid, dodecylphosphonic acid, or octadecylphosphonic acid as the phosphonic-acid-based compound denoted by Formula (3), and it is more preferable to use butylphosphonic acid, octylphosphonic acid, or dodecylphosphonic acid.

There is no particular limitation regarding specific examples of the phosphoric-acid-based compound denoted by Formula (4). Specific examples include butylphosphoric acid, pentylphosphoric acid, hexylphosphoric acid, octylphosphoric acid, nonylphosphoric acid, decylphosphoric acid, undecylphosphoric acid, dodecylphosphoric acid, tridecylphosphoric acid, tetradecylphosphoric acid, pentadecylphosphoric acid, hexadecylphosphoric acid, heptadecylphosphoric acid, octadecylphosphoric acid, nonadecylphosphoric acid, icosylphosphoric acid, didecylphosphoric acid, diundecylphosphoric acid, didodecylphosphoric acid, ditridecylphosphoric acid, ditetradecylphosphoric acid, dipentadecylphosphoric acid, dihexadecylphosphoric acid, diheptadecylphosphoric acid, dioctadecylphosphoric acid, dinanodecylphosphoric acid, and diicosylphosphoric acid. From the viewpoint of excellent water resistance, dispersibility, and glossiness, it is preferable to use butylphosphoric acid, octylphosphoric acid, or dodecylphosphoric acid as the phosphoric-acid-based compound denoted by Formula (4).

The content of the second surface treatment agent is preferably 10% by mass or more and 50% by mass or less, more preferably 12% by mass or more and 48% by mass or less, further preferably 15% by mass or more and 45% by mass or less, and still further preferably 20% by mass or more and 40% by mass or less relative to the total amount of the metal pigment contained in the coloring composition. When the content of the second surface treatment agent is 10% by mass or more, the water resistance tends to be excellent, and when the content is 50% by mass or less, the dispersibility and the glossiness tend to be excellent.

In addition, the content of the second surface treatment agent is preferably 0.05% by mass or more and by mass or less, more preferably 0.10% by mass or more and 2.5% by mass or less, further preferably 0.15% by mass or more and 2.0% by mass or less, and still further preferably 0.20% by mass or more and 1.0% by mass or less relative to the total amount of the coloring composition. When the content of the second surface treatment agent is by mass or more relative to the total amount of the coloring composition, the water resistance tends to be excellent, and when the content is 3.0% by mass or less, the dispersibility and the glossiness tend to be excellent.

In this regard, the coloring composition according to the present embodiment may contain surface treatment agents other than the first surface treatment agent and the second surface treatment agent within the bound of not impairing the advantages of the present disclosure. Examples of such a surface treatment agent include fluorine-based compounds. Regarding the fluorine-based compound, a compound containing fluorine and at least one selected from phosphorus, sulfur, and nitrogen as constituent elements can be favorably used, and specific examples include fluorine-based phosphonic acids, fluorine-based carboxylic acids, and fluorine-based sulfonic acids and salts thereof.

1.3. Water

The coloring composition according to the present embodiment is a water-based coloring composition containing water. The water-based coloring composition is a coloring composition containing at least water as a main solvent component of the coloring composition.

The content of the water can be appropriately adjusted in accordance with the application, that is, whether the coloring composition is an ink jet ink, a pigment dispersion liquid, or the like. In an example of the various applications, the content of the water is preferably 30% by mass or more and 98% by mass or less, more preferably 40% by mass or more and 95% by mass or less, further preferably 50% by mass or more and 90% by mass or less, and still further preferably 60% by mass or more and 80% by mass or less relative to the total amount of the coloring composition. When the content of the water is within the above-described range, the water resistance, the glossiness, and the dispersibility tend to be excellent.

1.4. Organic Solvent

The color composition according to the present embodiment contains water-soluble organic solvent. There is no particular limitation regarding such an organic solvent, and, for example, alcohols, hydrocarbon-based compounds, ether-based compounds, ketones, esters, propylene carbonate, N-methyl-2-pyrrolidone, N,N-dimethylformamide, N,N-dimethylacetamide, dimethylsulfoxide, cyclohexanone, and acetonitrile may be used.

Of these, alcohols may be used as the organic solvent. When alcohols are used, as a result of a synergistic effect with above-described surface treatment agent, the water resistance, the dispersibility, and the glossiness of the obtained composition tend to be further improved. In this regard, only one type of the organic solvents may be used, or two or more types thereof may be used in combination.

Specific examples of the alcohol serving as the organic solvent include monoalcohol-based compounds, such as methanol, ethanol, n-propyl alcohol, iso-propyl alcohol, 1-butanol (n-butanol), 2-butanol, tert-butanol, iso-butanol, n-pentanol, 2-pentanol, 3-pentanol, 3-methoxy-3-methylbutanol, and tert-pentanol; glycol-based compounds, such as 1,2-hexanediol, hexylene glycol, propylene glycol, ethylene glycol, diethylene glycol, triethylene glycol, dipropylene glycol, 1,3-propanediol, 1,2-butanediol, 1,2-pentanediol, 1,4-butanediol, 1,5-pentanediol, and 1,6-hexanediol; aromatic-alcohol-based compounds, such as 2-phenoxyethanol, phenoxy diglycol, (methoxyphenoxy)ethanol, methylphenoxyethanol, bis(3-hydroxyethyl) hydroquinone ether, nonylphenol, phenol, cresol, resorcinol, catechol, hydroquinone, naphthol, and furfuryl alcohol; and polyhydric alcohols such as glycerin.

Of these, it is preferable to contain the glycol-based compound and/or the aromatic-alcohol-based compound as the organic solvent contained in the coloring composition, and it is more preferable to contain the glycol-based compound. When such an organic solvent is used, as a result of a synergistic effect with the above-described surface treatment agent, the dispersibility, the water resistance, and the glossiness of the colored material tend to be further improved. Further, from the same viewpoint, it is more preferable that 1,2-hexanediol and 2-phenoxyethanol be contained.

In addition to the above, esters, alkylene glycol ethers, cyclic esters, alkoxyalkylamides, and the like may be contained as the organic solvent.

Examples of the ester include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, propylene glycol acetate propionate, propylene glycol acetate butylate, dipropylene glycol acetate butylate, and dipropylene glycol acetate propionate.

It is sufficient that the alkylene glycol ether is a monoether or a diether of alkylene glycol, and it may be an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Regarding the above-described alkylene glycol, the diether tends to readily dissolve or swell the resin in the ink composition compared with the monoether and is favorable from the point that the fastness to rubbing can be further improved.

Examples of the cyclic ester include cyclic esters (lactones), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; and compounds in which a hydrogen atom of a methylene group adjacent to a carbonyl group thereof is substituted with an alkyl group having the carbon number of 1 to 4.

Examples of the alkoxyalkylamide include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Lactams are mentioned as the cyclic amide, and examples include pyrrolidones, such as 2-pyrrolidone, 1-methyl-2-pyrrolidone, 1-ethyl-2-pyrrolidone, 1-propyl-2-pyrrolidone, and 1-butyl-2-pyrrolidone. These are favorable from the viewpoint of accelerating formation of a resin into a film, and, in particular, 2-pyrrolidone is more favorable.

The content of the organic solvent can be appropriately adjusted in accordance with the application of the coloring composition. In an example of various applications, the content of the organic solvent is preferably 10% by mass or more and 60% by mass or less, more preferably 15% by mass or more and 55% by mass or less, further preferably 20% by mass or more and 50% by mass or less, still further preferably 25% by mass or more and 45% by mass or less, and particularly preferably 30% by mass or more and 40% by mass or less relative to the total amount of the coloring composition. When the content of the organic solvent is within the above-described range, the water resistance, the glossiness, and the dispersibility tend to be excellent.

1.5. Other Components

The coloring composition according to the present embodiment may contain other components. Examples of the other component include dispersing agents and resins.

1.6. Application

There is no particular limitation regarding the application of the coloring composition according to the present embodiment. Since the coloring composition is suitable for use as a paint composition or an ink composition, it is preferable to use as such a material. The ink composition may be an ink jet ink composition. In addition, the coloring composition can also be used as a raw material for a pigment dispersion liquid.

2. Pigment Dispersion Liquid

In the present embodiment, the pigment dispersion liquid may be a pigment dispersion liquid used for preparing the paint composition or a pigment dispersion liquid used for preparing the ink composition.

The pigment dispersion liquid according to the present embodiment is a pigment dispersion liquid containing the metal pigment, the water, and the organic solvent, wherein the metal pigment is surface-treated with the first surface treatment agent and the second surface treatment agent, the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, and the carbon number of $R^1$ or $R^2$ of the first surface treatment agent is higher than the carbon number of $R^3$ or $R^4$ of the second surface treatment agent.

$$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \tag{3}$$

(in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2)

Regarding the metal pigment, the water, and the organic solvent contained in the pigment dispersion liquid and the surface treatment agent for surface-treating the metal pigment, the above-described materials and compounds can be used in accordance with the above-described amount of use and the method for use.

The pigment dispersion liquid according to the present embodiment may contain components other than the above-described materials. Examples of such a component include the other components exemplified for the coloring composition, and addition can be appropriately performed, as the situation demands.

3. Metal Pigment Producing Method

A metal pigment producing method according to the present embodiment includes a first surface treatment step of surface-treating the metal pigment with the first surface treatment agent and a second surface treatment step of surface-treating the metal pigment surface-treated with the first surface treatment agent with the second surface treatment agent, wherein the first surface treatment agent contains a phosphonic-acid-based compound denoted by Formula (1) below or a phosphoric-acid-based compound denoted by Formula (2) below, and the second surface treatment agent contains a phosphonic-acid-based compound denoted by Formula (3) below or a phosphoric-acid-based compound denoted by Formula (4) below.

$$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2) (in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2)

In the metal pigment producing method according to the present embodiment, after the first surface treatment step is performed, the second surface treatment step is performed by using a surface treatment agent having a shorter alkyl chain (that is, a lower-carbon-number alkyl chain) than the first surface treatment agent. Consequently, the area of the metal surface to which no surface treatment agent adsorbs is decreased, and the water resistance of the metal pigment can be improved. It is estimated that, as a result, the glossiness and the dispersibility of the coloring composition containing the metal pigment are also improved. However, the cause is not limited to this.

When the metal pigment is surface-treated, a known surface treatment method may be used. For example, adding the surface treatment agent to a dispersion liquid in which the metal pigment is dispersed in the organic solvent and applying ultrasonic waves thereto enable the surface treatment agent to be coupled to the metal pigment surface. In such an instance, regarding the amount of the surface treatment agent added, the above-described amount may be appropriately added.

Further, the surface treatment agent may be directly applied to the metal pigment surface, or the metal pigment pretreated with an acid or a base may be treated with the surface treatment agent. Consequently, the metal pigment surface can be more reliably chemically modified with the surface treatment agent, and the above-described advantages of the present disclosure can be more effectively realized. In this regard, the treatment with an acid or a base can remove an oxide film of the metal pigment, and, as a result, the glossiness can be improved.

There is no particular limitation regarding the acid used for the pretreatment, and examples include protonic acids, such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorus acid, and hypophosphorous acid. On the other hand, there is no particular limitation regarding the base used for the pretreatment, and examples include sodium hydroxide, potassium hydroxide, and calcium hydroxide.

3.1. First Surface Treatment Step

Regarding the first surface treatment step, the surface treatment may be performed in a solvent-based medium. When the first surface treatment step is performed in the solvent-based medium, the water resistance, the glossiness, and the dispersibility tend to be improved. In this regard, in the present embodiment, the solvent-based medium is a medium containing an organic solvent among media used for performing the surface treatment of the metal pigment. Only one type of the solvent-based media may be used, or two or more types thereof may be used in combination.

There is no particular limitation regarding such a solvent-based medium, and examples include diethylene glycol diethyl ether, diethylene glycol ethylmethyl ether, ethylene glycol dimethyl ether, ethylene glycol diethyl ether, diethylene glycol dimethyl ether, ethylene glycol monomethyl ether, ethylene glycol monoisopropyl ether, and ethylene glycol monobutyl ether. Of these, from the viewpoint of improving the water resistance, the glossiness, and the dispersibility, the surface treatment may be performed in diethylene glycol diethyl ether.

3.2. Second Surface Treatment Step

Regarding the second surface treatment step, the surface treatment may be performed in a water-based medium. When the second surface treatment step is performed in the water-based medium, the second surface treatment agent readily adsorbs to the metal pigment surface, and the water resistance tends to be improved.

There is no particular limitation regarding the water-based medium, and the above-described water-soluble organic solvents, water, and the like can be used. Materials akin to the ink water having the same composition as the composition of the above-described water-based coloring composition may be used except that the metal pigment is not contained.

In the metal pigment producing method, regarding the metal pigment and the surface treatment agent to be used, the above-described materials and compounds can be used.

4. Coloring Method

The coloring method according to the present embodiment may be printing by an ink jet method including a step of attaching the above-described coloring composition to an object to be colored or painting for attaching a paint to an object to be colored by using a spray, a brush, a bar coater, or the like.

When the coloring composition according to the present embodiment is used as a paint composition, examples of the method for applying the paint composition to the object to be colored include a blushing method, a spraying method, a dipping method, a flow coating method, and a spin coating method. In this regard, after the attaching step, a heat-drying step may be included. In the heat-drying step, the object to be colored which is coated with the coloring composition is heat-dried.

Further, when the coloring composition is used as a raw material for an ink composition, examples of the method for applying the ink composition to an object to be colored include an ink jet method in which the ink composition is ejected from an ink jet head. More specifically, a pressure generation unit disposed in an ink jet head is operated, and an ink introduced into the pressure generation chamber of the ink jet head is ejected from a nozzle. Examples of the ink jet head used in the attaching step include a line head for performing coloring based on a line system and a serial head for performing coloring based on a serial system.

5. Coloring Apparatus

An example of the coloring apparatus usable for ink jet coloring when the coloring composition according to the present embodiment is used as the ink jet ink composition will be described below in detail.

Such an ink jet coloring apparatus includes an ink jet head having a nozzle for ejecting the ink jet ink to the object to be colored and a transport unit for transporting the object to be colored. The ink jet head includes a pressure chamber to which the ink is supplied and a nozzle for ejecting the ink. In this regard, the transport unit is composed of a transport roller and a transport belt disposed in the coloring apparatus.

An example of the coloring apparatus according to the present embodiment will be described below with reference to FIGURE. In this regard, in the X-Y-Z coordinate system illustrated in FIGURE, the X-direction indicates the length direction of the object to be colored, the Y-direction indicates the width direction of the object to be colored in the transport path in the coloring apparatus, and the Z-direction indicates the height direction of the apparatus.

An example of a coloring apparatus 10 is a line-type ink jet printer capable of performing high-speed and high-density printing. The coloring apparatus 10 includes a feed portion 12 for storing an object to be colored P such as paper, a transport portion 14, a belt transport portion 16, a coloring portion 18, a Fd (facedown) discharge portion 20 serving as a "discharge portion", a Fd (facedown) mounting portion 22 serving as a "mounting portion", an inversion path portion 24 serving as an "inversion transport mechanism", a Fu (faceup) discharge portion 26, and a Fu (faceup) mounting portion 28.

The feed portion 12 is arranged in the apparatus lower portion of the coloring apparatus 10. The feed portion 12 includes a feed tray 30 for storing the object to be colored P and the feed roller 32 for feeding the object to be colored P stored in the feed tray 30 to a transport path 11.

The object to be colored P stored in the feed tray 30 is fed to the transport portion 14 along the transport path 11 by the feed roller 32. The transport portion 14 includes a transport driving roller 34 and a transport driven roller 36. The transport driving roller 34 is driven to rotate by a driving source not illustrated in the drawing. In the transport portion 14, the object to be colored P is nipped between the transport driving roller 34 and the transport driven roller 36 and is transported to a belt transport portion 16 located downstream of the transport path 11.

The belt transport portion 16 includes a first roller 38 located at the upstream position of the transport path 11, a second roller 40 located at the downstream position, an endless belt 42 rotatably looped around the first roller 38 and the second roller 40, and a support body 44 for supporting the upper section 42a of the endless belt 42 between the first roller 38 and the second roller 40.

The endless belt 42 is driven to move from the +X direction to the –X direction in the upper section 42a by the first roller 38 or the second roller 40 driven by a driving source not illustrated in the drawing. Consequently, the object to be colored P transported from the transport portion 14 is further transported to the downstream position of the transport path 11 in the belt transport portion 16.

The coloring portion 18 includes a line-type ink jet head 48 and a head holder 46 for holding the ink jet head 48. In this regard, the coloring portion 18 may be a serial type in which an ink jet head is disposed on a carriage reciprocating in the Y-axis direction. The ink jet head 48 is arranged opposing the upper section 42a of the endless belt 42 supported by the support body 44. When the object to be colored P is transported in the upper section 42a of the endless belt 42, the ink jet head 48 ejects an ink toward the object to be colored P and performs coloring. The object to be colored P is transported by the belt transport portion 16 to the downstream position of the transport path 11 while being colored.

In this regard, the "line-type ink jet head" is a head in which a nozzle region formed in the direction intersecting the transport direction of the object to be colored P is disposed so as to be able to cover the entire object to be colored P in the intersection direction and which is used for a coloring apparatus for forming an image while one of the head and the object to be colored P is fixed and the other is moved. In this regard, the nozzle region in the intersecting direction of the line head is not limited to being able to cover the entire object to be colored P in the intersection direction in correspondence with the coloring apparatus.

A first branching portion 50 is disposed at the downstream position of the transport path 11 in the belt transport portion 16. The first branching point 50 is configured to be able to switch between the transport path 11 for transporting the object to be colored P to the Fd discharge portion 20 or the Fu discharge portion 26 and an inversion path 52 in the inversion path portion 24 for inverting the colored surface of the object to be colored P and for transporting again the object to be colored P to the coloring portion 18. In this regard, the object to be colored P transported in the inversion path 52 due to switching by the first branching point 50 is transported again to the coloring portion 18 while the surface opposite to the initially colored surface faces the ink jet head 48 due to the colored surface being inverted during transportation in the inversion path 52.

A second branching portion 54 is further disposed downstream of the first branching portion 50 along the transport path 11. The second branching portion 54 is configured to be able to switch the transport direction of the object to be colored P so that the object to be colored P is transported toward the Fd discharge portion 20 or the object to be colored P is transported toward the Fu discharge portion 26.

The object to be colored P transported toward the Fd discharge portion 20 in the second branching portion 54 is discharged from the Fd discharge portion 20 and is mounted on the Fd mounting portion 22. In such an instance, the object to be colored P is mounted so that the colored surface faces the Fd mounting portion 22. On the other hand, the object to be colored P transported toward the Fu discharge portion 26 in the second branching portion 54 is discharged from the Fu discharge portion 26 and is mounted on the Fu mounting portion 28. In such an instance, the object to be colored P is mounted so that the colored surface faces in the direction opposite to the Fu mounting portion 28.

In the above description, an example in which the line-type ink jet head is used is explained, but the coloring apparatus according to the present embodiment may be a printer (serial printer) by using a serial-type ink jet head. Regarding the serial printer, printing is performed by transporting the object to be colored P in the transport direction while the ink jet head is moved in the direction intersecting the transport direction.

6. Object to be Colored

There is no particular limitation regarding the object to be colored used in the present embodiment, and, for example, an absorbent or nonabsorbent object to be colored may be used in accordance with the application.

There is no particular limitation regarding the absorbent object to be colored, and examples include normal paper having high ink jet ink permeability such as electrographic paper, ink jet paper (ink jet exclusive paper including an ink absorption layer composed of silica particles or alumina particles or an ink absorption layer composed of a hydrophilic polymer such as a polyvinyl alcohol (PVA) or a polyvinylpyrrolidone (PVP), and art paper, coated paper, and cast paper which have relatively low ink permeability and which are used for general offset printing.

There is no particular limitation regarding the nonabsorbent object to be colored, and examples include plastic films and plates formed of polyvinylchlorides, polyethylenes, polypropylenes, polyethylene terephthalates (PETs), polycarbonates, polystyrenes, polyurethanes, and the like; metal plates formed of iron, silver, copper, aluminum, and the like; metal plates or plastic films and alloy plates such as stainless steel and brass, produced by vapor-depositing these various types of metals; and objects to be colored in which a plastic film of a polyvinylchloride, a polyethylene, a polypropylene, a polyethylene terephthalate (PET), a polycarbonate, a polystyrene, a polyurethane, or the like is bonded (coating) to paper base materials.

EXAMPLES

The present disclosure will be more specifically described below with reference to the examples and the comparative examples. The present disclosure is not limited to the following examples.

1. Preparation of Coloring Composition

A mold release layer was formed by coating 20-μm PET base material with a mold release resin dissolved in acetone by using a roll coater. The PET base material with the mold release layer was transported to an aluminum vapor deposition apparatus at a speed of 5 m/s, and an aluminum layer having a film thickness of 15 nm was formed under reduced pressure. The resulting aluminum/mold release resin/PET base material was immersed in a tetrahydrofuran bath, and the aluminum pigment was peeled off the PET due to application of a 40-kHz ultrasonic wave so as to obtain a peeled liquid of an aluminum pigment. Subsequently, tetrahydrofuran was removed by using a centrifuge, and an appropriate amount of diethylene glycol diethyl ether was added so as to obtain an aluminum particle suspension liquid having an aluminum concentration of 5% by mass.

The aluminum pigment suspension liquid (5%, diethylene glycol diethyl ether) was pulverized by using a circulation-type high-power ultrasonic pulverizer (20 kHz), and pulverization was performed until a predetermined average particle diameter was reached so as to obtain an aluminum pigment suspension liquid having a particle diameter of 0.5 μm or less applicable to an ink jet.

After the pulverization step, heat treatment was performed at 55° C. for 1 hour under application of a 40-kHz ultrasonic wave to deflocculate aggregates so as to disperse primary particles of aluminum pigment. A first surface treatment agent was added to the aluminum pigment suspension liquid in which primary particles were dispersed, and heat treatment was performed at 55° C. for 3 hours under application of a 28-kHz ultrasonic wave.

The resulting aluminum dispersion liquid was subjected to centrifugal separation, and the solvent of the aluminum dispersion liquid was substituted by the ink water presented in Table 1 to Table 3 so as to prepare an ink composition. Herein, a second surface treatment agent was added and heat treatment was performed as above so that an ink composition containing a surface-treated metal pigment was obtained finally. In this regard, when the solvent removed from the surface-treated aluminum pigment dispersion liquid after the surface treatment was analyzed, the surface treatment agent was not contained in all examples. Consequently, it is conjectured that the surface treatment agent in each example in the table is attached to the metal particle contained in the composition.

In this regard, the numerical value of each component of each example presented in the table indicates % by mass relative to the total amount of the coloring composition, unless otherwise specified. The numerical value of the metal pigment in the table indicates % by mass of a solid content. In the table, the surface treatment agent having the longest hydrocarbon group in each example is the first surface treatment agent, and the surface treatment agent having the second longest hydrocarbon group is the second surface treatment agent.

TABLE 1

| | | Example 1 | Example 2 | Example 3 | Example 4 | Example 5 | Example 6 | Example 7 |
|---|---|---|---|---|---|---|---|---|
| Metal pigment (aluminum particle) | Particle diameter $D_{50}$ [μm] | 0.47 | 0.47 | 0.47 | 0.47 | 0.47 | 0.47 | 0.47 |
| | Content | 1.20 | 1.20 | 1.20 | 1.20 | 1.20 | 1.20 | 1.20 |
| Surface treatment agent | Docosyl ($C_{22}H_{45}$) phosphonic acid | | | | | | | 0.24 |
| | Octadecyl ($C_{18}H_{37}$) phosphonic acid | 0.36 | 0.36 | 0.36 | 0.36 | 0.36 | 0.36 | 0.36 |
| | Octadecyl ($C_{18}H_{37}$) phosphoric acid | | | | | | | |
| | Dodecyl ($C_{12}H_{25}$) phosphonic acid | 0.24 | | | | | | |
| | Dodecyl ($C_{12}H_{25}$) phosphoric acid | | 0.24 | | | | | |
| | Octyl ($C_8H_{17}$) phosphonic acid | | | 0.24 | | | | |
| | Octyl ($C_8H_{17}$) phosphoric acid | | | | 0.24 | | | |
| | Butyl ($C_4H_9$) phosphonic acid | | | | | 0.24 | | |
| | Butyl ($C_4H_9$) phosphoric acid | | | | | | 0.24 | |
| | Ethyl ($C_2H_5$) phosphonic acid | | | | | | | |
| | Ethyl ($C_2H_5$) phosphoric acid | | | | | | | |
| | FHP | | | | | | | |
| Organic solvent | 1,2-Hexanediol ($C_6H_{14}O_2$) | 30.0 | 30.0 | 30.0 | 30.0 | 30.0 | 30.0 | 30.0 |
| | 2-Phenoxy Ethanol ($C_8H_{10}O_2$) | 5.00 | 5.00 | 5.00 | 5.00 | 5.00 | 5.00 | 5.00 |
| | Pure water | rest | rest | rest | rest | rest | rest | rest |
| | Total | 100 | 100 | 100 | 100 | 100 | 100 | 100 |
| Evaluation | Water resistance | A | B | B | B | C | C | B |
| | Glossiness | A | A | A | B | B | C | C |
| | Dispersibility | A | A | B | B | B | B | C |

TABLE 2

| | | Example 6 | Example 7 | Example 8 | Example 9 | Example 10 |
|---|---|---|---|---|---|---|
| Metal pigment (aluminum particle) | Particle diameter $D_{50}$ [μm] | 0.47 | 0.47 | 0.47 | 0.47 | 0.47 |
| | Content | 1.20 | 1.20 | 1.20 | 1.20 | 1.20 |
| Surface treatment agent | Docosyl ($C_{22}H_{45}$) phosphonic acid | | | | | |
| | Octadecyl ($C_{18}H_{37}$) phosphonic acid | | | | | |
| | Octadecyl ($C_{18}H_{37}$) phosphoric acid | 0.24 | | | | |
| | Dodecyl ($C_{12}H_{25}$) phosphonic acid | 0.36 | 0.36 | 0.36 | 0.36 | 0.36 |
| | Dodecyl ($C_{12}H_{25}$) phosphoric acid | | | | | |
| | Octyl ($C_8H_{17}$) phosphonic acid | | 0.24 | | | |
| | Octyl ($C_8H_{17}$) Phosphoric acid | | | 0.24 | | |
| | Butyl ($C_4H_9$) Phosphonic acid | | | | 0.24 | |
| | Butyl ($C_4H_9$) Phosphoric acid | | | | | 0.24 |
| | Ethyl ($C_2H_5$) Phosphonic acid | | | | | |
| | Ethyl ($C_2H_5$) Phosphoric acid | | | | | |
| | FHP | | | | | |
| Organic solvent | 1,2-Hexanediol ($C_6H_{14}O_2$) | 30.0 | 30.0 | 30.0 | 30.0 | 30.0 |
| | 2-Phenoxy Ethanol ($C_8H_{10}O_2$) | 5.00 | 5.00 | 5.00 | 5.00 | 5.00 |
| | Pure water | rest | rest | rest | rest | rest |
| | Total | 100 | 100 | 100 | 100 | 100 |
| Evaluation | Water resistance | B | B | B | C | C |
| | Glossiness | A | A | B | C | C |
| | Dispersibility | A | B | B | B | C |

35

TABLE 3

| | | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Metal pigment (aluminum particle) | Particle diameter $D_{50}$ [μm] | 0.47 | 0.47 | 0.47 | 0.47 | 0.47 | 0.47 | 0.47 | 0.47 |
| | Content | 1.20 | 1.20 | 1.20 | 1.20 | 1.20 | 1.20 | 1.2 | 1.20 |
| Surface treatment agent | Docosyl ($C_{22}H_{45}$) phosphonic acid | | | | | | | | |
| | Octadecyl ($C_{18}H_{37}$) phosphonic acid | 0.36 | 0.36 | 0.36 | | | | 0.36 | |
| | Octadecyl ($C_{18}H_{37}$) phosphoric acid | | | | 0.36 | 0.36 | 0.36 | | |
| | Dodecyl ($C_{12}H_{25}$) phosphonic acid | | | | | | | | |
| | Dodecyl ($C_{12}H_{25}$) phosphoric acid | | | | | | | | |
| | Octyl ($C_8H_{17}$) phosphonic acid | | | | | | | | |
| | Octyl ($C_8H_{17}$) phosphoric acid | | | | | | | | |
| | Butyl ($C_4H_9$) phosphonic acid | | | | | | | | |
| | Butyl ($C_4H_9$) phosphoric acid | | | | | | | | |
| | Ethyl ($C_2H_5$) phosphonic acid | 0.24 | | | 0.24 | | | | 0.36 |
| | Ethyl ($C_2H_5$) phosphoric acid | | 0.24 | | | 0.24 | | | |
| | FHP | | | 0.24 | | | 0.24 | | |

TABLE 3-continued

| | | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Organic solvent | 1,2-Hexanediol ($C_6H_{14}O_2$) | 30.0 | 30.0 | 30.0 | 30.0 | 30.0 | 30.0 | 30.0 | 30.0 |
| | 2-Phenoxy Ethanol ($C_8H_{10}O_2$) | 5.00 | 5.00 | 5.00 | 5.00 | 5.00 | 5.00 | 5.00 | 5.00 |
| | Pure water | rest | rest | rest | rest | rest | rest | rest | rest |
| | Total | 100 | 100 | 100 | 100 | 100 | 100 | 100 | 100 |
| Evaluation | Water resistance | D | E | D | E | E | E | D | E |
| | Glossiness | C | D | D | D | E | D | D | E |
| | Dispersibility | D | D | D | D | D | D | D | E |

The abbreviations used in Table 1 to Table 3 and detailed product components are as described below.

Surface Treatment Agent

Docosyl ($C_{22}H_{45}$) phosphonic acid (produced by TOKYO KASEI KOGYO CO., LTD.)

Octadecyl ($C_{18}H_{37}$) phosphonic acid (produced by TOKYO KASEI KOGYO CO., LTD.)

Octadecyl ($C_{18}H_{37}$) phosphoric acid (produced by TOKYO KASEI KOGYO CO., LTD.)

Dodecyl ($C_{12}H_{25}$) phosphonic acid (produced by TOKYO KASEI KOGYO CO., LTD.)

Dodecyl ($C_{12}H_{25}$) phosphoric acid (produced by TOKYO KASEI KOGYO CO., LTD.)

Octyl ($C_8H_{17}$) phosphonic acid (produced by TOKYO KASEI KOGYO CO., LTD.)

Octyl ($C_8H_{17}$) phosphoric acid (produced by TOKYO KASEI KOGYO CO., LTD.)

Butyl ($C_4H_9$) phosphonic acid (produced by TOKYO KASEI KOGYO CO., LTD.)

Butyl ($C_4H_9$) phosphoric acid (produced by TOKYO KASEI KOGYO CO., LTD.)

Ethyl ($C_2H_5$) phosphonic acid (produced by TOKYO KASEI KOGYO CO., LTD.)

Ethyl ($C_2H_5$) phosphoric acid (produced by TOKYO KASEI KOGYO CO., LTD.)

FHP (perfluorohexylphosphonic acid, produced by UNIMATEC CO., LTD.)

Organic Solvent 1,2-Hexanediol ($C_6H_{14}O_2$)

2-Phenoxyethanol ($C_8H_{10}O_2$)

2. Evaluation Method 2.1. Particle Diameter and the Like

The volume average particle diameter ($D_{50}$) of the metal pigment was measured by using Microtrac MT-3300 (laser diffraction-scattering particle size distribution analyzer produced by MicrotracBEL Corp.). In this regard, all metal pigments had a scale-like shape.

2.2. Water Resistance

The coloring composition obtained as described above in an amount of 10 cc was enclosed into an aluminum package. The resulting aluminum package was stored at a constant temperature of 70° C. for 6 days. The amounts of gas generated per unit mass of the coloring composition before the coloring composition was enclosed into the aluminum package and after the coloring composition was enclosed and stored under the above-described conditions were determined, and the water resistance was evaluated in accordance with the following evaluation criteria. Table 1 to Table 3 present the evaluation results of the water resistance.

Evaluation Criteria

A: the amount of gas generated is less than 0.1 ml/g

B: the amount of gas generated is 0.1 ml/g or more and less than 0.15 ml/g

C: the amount of gas generated is 0.15 ml/g or more and less than 0.19 ml/g

D: the amount of gas generated is 0.19 ml/g or more and less than 1.0 ml/g

E: the amount of gas generated is 1.0 ml/g or more 2.3. Glossiness

A modified apparatus of an ink jet printer (SC-580650 produced by Seiko Epson Corporation) was used, an ink jet head was filled with the coloring composition of each example, a drive waveform of the ink jet head was optimized to perform optimum ejection, and a colored material of each example was formed. The nozzle density of the nozzle line of the ink jet head was set to be 360 npi, 360 nozzles. A polyvinyl film (Mactac 5829R produced by Mactac) was used as an object to be colored. When coloring was performed, the amount of ink attached to a colored pattern was set to be 5 mg/inch$^2$ and color resolution was set to be 1,440×1,440 dpi.

Regarding a colored portion of the thus obtained colored material, the glossiness was measured by using MINOLTA MULTI GLOSS 268 serving as a gross meter at a measuring angle of 60°, and evaluation was performed in accordance with the following evaluation criteria. The glossy metallic appearance tends to become excellent with increasing value of the glossiness. Table 1 to Table 3 present the evaluation results of the glossiness.

Evaluation Criteria

A: the glossiness is 400 or more

B: the glossiness is 350 or more and less than 400

C: the glossiness is 300 or more and less than 350

D: the glossiness is 250 or more and less than 300

E: the glossiness is less than 250

2.4. Dispersibility

A portion of the 5%-by-mass suspension solution of the metal pigment containing diethylene glycol diethyl ether which was obtained during the production process of the above-described coloring composition and which was subjected to the 20-kHz ultrasonic wave treatment was taken and ESLEAM AD-374M (produced by NOF CORPORATION) serving as a dispersing agent which exhibited favorable dispersibility in a nonaqueous medium was added thereto to disperse metal particles so as to form a state of dispersion liquid. The volume average particle diameter $D_{50}$ of the metal pigment included in the resulting dispersion liquid was measured by using Microtrac MT-3300 (laser diffraction-scattering particle size distribution analyzer produced by MicrotracBEL Corp.), and the resulting value was taken as the reference value.

Subsequently, 100 mL of the above-described coloring composition was placed into a glass container, sealed, and left to stand at room temperature for a month. The container left to stand was shaken 10 times, and the volume average particle diameter $D_{50}$ of the metal pigment of the coloring composition was measured by using the above-described apparatus. The rate of increase of $D_{50}$ from the above-described reference value before placement into a constant temperature bath was determined, and the dispersibility was evaluated in accordance with the following evaluation criteria. The dispersibility of the metal pigment tends to become excellent with decreasing rate of increase of the volume average particle diameter $D_{50}$. Table 1 to Table 3 present the evaluation results of the dispersibility.

Evaluation Criteria

A: the particle diameter ($D_{50}$) in the ink is less than 110% of the pulverized particle diameter B: the particle diameter ($D_{50}$) in the ink is 110% or more and less than 150% of the pulverized particle diameter C: the particle diameter ($D_{50}$) in the ink is 150% or more and less than 200% of the pulverized particle diameter D: the particle diameter ($D_{50}$) in the ink is 200% or more and less than 500% of the pulverized particle diameter E: the particle diameter ($D_{50}$) in the ink is 500% or more of the pulverized particle diameter 3. Evaluation Result Table 1 to Table 3 present the composition of the ink used in each example and the evaluation results. It is found from Table 1 to Table 3 that a water-based coloring composition containing a metal pigment, water, and an organic solvent, wherein the metal pigment is surface-treated with a first surface treatment agent and a second surface treatment agent, the first surface treatment agent contains a phosphonic-acid-based compound denoted by Formula (1) or a phosphoric-acid-based compound denoted by Formula (2), the second surface treatment agent contains a phosphoric-acid-based compound denoted by Formula (3) or a phosphoric-acid-based compound denoted by Formula (4), and the carbon number of $R^1$ or $R^2$ of the first surface treatment agent is higher than the carbon number of $R^3$ or $R^4$ of the second surface treatment agent, has excellent water resistance, glossiness, and dispersibility.

What is claimed is:

1. A water-based coloring composition comprising:

a metal pigment;

water; and an organic solvent, wherein the metal pigment is surface-treated with a first surface treatment agent and a second surface treatment agent, the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, $$(R^1)PO(OH)_2 \qquad (1)$$

(in Formula (1), $R^1$ represents a hydrocarbon group having a carbon number of 12 or more in which a hydrogen atom is not limited to being substituted with a substituent)

$$(R^2O)_a PO(OH)_{3-a} \qquad (2)$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \qquad (3)$$

(in Formula (3), $R^3$ represents a hydrocarbon group having a carbon number of 4 or more in which a hydrogen atom is not limited to being substituted with a substituent)

$$(R^4O)_b PO(OH)_{3-b} \qquad (4)$$

(in Formula (4), $R^4$ represents independently a hydrocarbon group having a carbon number of 4 or more in which a hydrogen atom is not limited to being substituted with a substituent, and b is an integer of 1 or 2), and the carbon number of $R^1$ or $R^2$ of the first surface treatment agent is higher than the carbon number of $R^3$ or $R^4$ of the second surface treatment agent, wherein a content of the first surface treatment agent ranges from 0.05% by mass to 10% by mass, relative to a total amount of the coloring composition; and wherein a content of the second surface treatment agent ranges from 0.05% by mass to 10% by mass, relative to a total amount of the coloring composition.

2. The water-based coloring composition according to claim 1, wherein a difference between the carbon number of $R^1$ or $R^2$ of the first surface treatment agent and the carbon number of $R^3$ or $R^4$ of the second surface treatment agent is 4 or more and 14 or less.

3. The water-based coloring composition according to claim 1, wherein the carbon number of $R^3$ or $R^4$ of the second surface treatment agent is 11 or less.

4. The water-based coloring composition according to claim 1, wherein a content of the water is 50% by mass or more and 90% by mass or less relative to a total amount of the water-based coloring composition.

5. The water-based coloring composition according to claim 1, wherein a content of the organic solvent is 10% by mass or more and 60% by mass or less relative to a total amount of the water-based coloring composition.

6. The water-based coloring composition according to claim 1, wherein a content of the metal pigment is 0.5% by mass or more and 20% by mass or less relative to a total amount of the water-based coloring composition.

7. The water-based coloring composition according to claim 1, wherein the water-based coloring composition is a paint composition or an ink composition.

8. The water-based coloring composition according to claim 1, wherein the metal pigment is composed of aluminum or an aluminum alloy.

9. A coloring method comprising:

attaching the water-based coloring composition according to claim 1 to an object to be colored.

10. A pigment dispersion liquid comprising:

a metal pigment;

water; and an organic solvent, wherein the metal pigment is surface-treated with a first surface treatment agent and a second surface treatment agent, the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, $$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \tag{3}$$

(in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2), and the carbon number of $R^1$ or $R^2$ of the first surface treatment agent is higher than the carbon number of $R^3$ or $R^4$ of the second surface treatment agent, wherein a content of the first surface treatment agent ranges from 0.05% by mass to 10% by mass, relative to a total amount of the coloring composition; and wherein a content of the second surface treatment agent ranges from 0.05% by mass to 10% by mass, relative to a total amount of the coloring composition.

11. A metal pigment producing method comprising:

a first surface treatment step of surface-treating a metal pigment with a first surface treatment agent; and a second surface treatment step of surface-treating the metal pigment surface-treated with the first surface treatment agent with a second surface treatment agent, wherein the first surface treatment agent contains a phosphonic-acid-based compound denoted by Formula (1) below or a phosphoric-acid-based compound denoted by Formula (2) below, the second surface treatment agent contains a phosphonic-acid-based compound denoted by Formula (3) below or a phosphoric-acid-based compound denoted by Formula (4) below, $$(R^1)PO(OH)_2 \tag{1}$$

(in Formula (1), $R^1$ represents a hydrocarbon group having a carbon number of 12 or more in which a hydrogen atom is not limited to being substituted with a substituent)

$$(R^2O)_aPO(OH)_{3-a} \tag{2}$$

(in Formula (2), $R^2$ represents independently a hydrocarbon group having a carbon number of 12 or more in which a hydrogen atom is not limited to being substituted with a substituent, and a is an integer of 1 or 2)

$$(R^3)PO(OH)_2 \tag{3}$$

(in Formula (3), $R^3$ represents a hydrocarbon group having a carbon number of 4 or more in which a hydrogen atom is not limited to being substituted with a substituent)

$$(R^4O)_bPO(OH)_{3-b} \tag{4}$$

(in Formula (4), $R^4$ represents independently a hydrocarbon group having a carbon number of 4 or more in which a hydrogen atom is not limited to being substituted with a substituent, and b is an integer of 1 or 2), and the carbon number of $R^1$ or $R^2$ of the first surface treatment agent is higher than the carbon number of $R^3$ or $R^4$ of the second surface treatment agent, wherein a content of the first surface treatment agent ranges from 0.05% by mass to 10% by mass, relative to a total amount of the coloring composition; and wherein a content of the second surface treatment agent ranges from 0.05% by mass to 10% by mass, relative to a total amount of the coloring composition.

12. The metal pigment producing method according to claim 11, wherein the surface treatment with the first surface treatment agent is performed in a solvent-based medium during the first surface treatment step.

13. The metal pigment producing method according to claim 11, wherein the surface treatment with the second surface treatment agent is performed in a water-based medium during the second surface treatment step.

\* \* \* \* \*